US011281686B2

(12) United States Patent
Dhaka et al.

(10) Patent No.: US 11,281,686 B2
(45) Date of Patent: Mar. 22, 2022

(54) INFORMATION PROCESSING APPARATUS, METHOD, AND PROGRAM

(71) Applicant: NEC Corporation, Tokyo (JP)

(72) Inventors: Devendra Dhaka, Tokyo (JP); Masato Ishii, Tokyo (JP); Atsushi Sato, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 15/734,442

(22) PCT Filed: Jun. 4, 2018

(86) PCT No.: PCT/JP2018/021423
§ 371 (c)(1),
(2) Date: Dec. 2, 2020

(87) PCT Pub. No.: WO2019/234802
PCT Pub. Date: Dec. 12, 2019

(65) Prior Publication Data
US 2021/0216563 A1 Jul. 15, 2021

(51) Int. Cl.
G06F 16/00 (2019.01)
G06F 16/25 (2019.01)
(Continued)

(52) U.S. Cl.
CPC ......... G06F 16/254 (2019.01); G06F 16/212 (2019.01); G06F 16/24568 (2019.01); G06F 16/285 (2019.01)

(58) Field of Classification Search
CPC .................................................. G06F 16/254
(Continued)

(56) References Cited

U.S. PATENT DOCUMENTS

2014/0280153 A1* 9/2014 Cronin .................. G06F 16/248
707/737
2014/0344183 A1 11/2014 Fujimaki et al.
(Continued)

FOREIGN PATENT DOCUMENTS

JP 2013-097615 A 5/2013
JP 2016-520220 A 7/2016

OTHER PUBLICATIONS

International Search Report for PCT Application No. PCT/JP2018/021423, dated Aug. 21, 2018.
(Continued)

Primary Examiner — Alexandria Y Bromell
(74) Attorney, Agent, or Firm — Sughrue Mion, PLLC

(57) ABSTRACT

The information processing apparatus (2000) of the example embodiment 1 includes an acquisition unit (2020), a clustering unit (2040), a transformation unit (2060) and modeling unit (2080). Until a predetermined termination condition is determined, the clustering unit (2040) repeatedly preforms: 1) optimizing the posterior parameters for clustering assignment for each data streams; 2) optimizes the posterior parameters for each determined cluster and for each time frame; 3) optimizes the posterior parameters for individual responses for each data stream; 4) optimizes the posterior parameters for latent states, via approximating the observation model through non-conjugate inference. The transformation unit (2060) transforms the latent states into parameters of the observation model, through a transformation function. The modeling unit (2060) generates the model data, which including all the optimized parameters of all the model latent variables, optimized inside the clustering unit (2040).

9 Claims, 4 Drawing Sheets

(51) Int. Cl.
*G06F 16/2455* (2019.01)
*G06F 16/28* (2019.01)
*G06F 16/21* (2019.01)

(58) Field of Classification Search
USPC .................................................. 707/602, 737
See application file for complete search history.

(56) References Cited

U.S. PATENT DOCUMENTS

| | | | |
|---|---|---|---|
| 2015/0199744 A1* | 7/2015 | Tolvanen | G06Q 30/0631 |
| | | | 707/737 |
| 2016/0358312 A1* | 12/2016 | Kolb, V | G06T 3/40 |
| | | | 707/602 |
| 2017/0300566 A1* | 10/2017 | Robb | G06F 16/909 |
| | | | 707/602 |
| 2017/0322861 A1* | 11/2017 | Chan | G06F 9/5005 |
| | | | 707/602 |

OTHER PUBLICATIONS

Written opinion for PCT Application No. PCT/JP2018/021423, dated Aug. 21, 2018.

* cited by examiner

INFORMATION PROCESSING APPARATUS, METHOD, AND PROGRAM

This application is a National Stage Entry of PCT/JP2018/021423 filed on Jun. 4, 2018, the contents of all of which are incorporated herein by reference, in their entirety.

TECHNICAL FIELD

Embodiments of the invention generally relate to the field of time series analysis and data mining.

BACKGROUND ART

In current data revolution phase of internet era, immense growth of accumulated data demands generic and efficient algorithms for careful analysis. One such field is time series or sequential data analysis, which includes tracked object trajectories, financial data streams, daily user activity data or categorical data and count data such as vehicular traffic count or patient arrivals etc. Very often, the analysis of such data includes clustering or anomaly detection, which aims to give meaningful understanding of the huge data ensemble. Theoretically, both the clustering and anomaly detection task requires a generative modeling of the dataset or the density modeling. However, in the literature so far, the clustering algorithms are limited to only single type of datasets, thus these models are very specific and are difficult to generalize over different data type.

The time series modeling and recognition task can be performed in two phases: training phase (also called modeling phase) and test phase. The training phase, which is mostly unsupervised, aims at generative modeling of the input data streams. Note that, data stream means a sequence of data, such as time-series data. The generative model during training phase consists global and local latent variables, these can be thought as random variables of a Bayesian model. The global variables represent the overall dynamics of the data over time, and are shared across multiple data streams to enforce similarity. Whereas the local variables are used to represent the local dynamics and the latent structure of each data stream. The local variables are derived using both global variables and the observed data, where global variables come from prior or initial belief and local variables. Once training phase is complete, the posterior information about both local and global variables are stored as model data, this information is used to evaluate the likelihood of each input data stream.

The information in the model data includes all the posterior parameters that are optimized during learning over the training dataset, these parameters are sufficient to represent the dataset through posterior distributions that are defined during inference. Intuitively these parameters can be thought as the best or optimal set of parameters that maximizes the posterior of the parameters given the training data, thus for a different dataset, these optimal parameters will be different. However, for same training and test dataset, these parameters can also well represent the test data.

During test phase, the global variables are used to determine the posterior predictive or test likelihood for each test data.

The clustering of the input data streams involves cluster assignment rule which further demands computing the data likelihood for that data to belong to the cluster. For anomaly detection task, one needs to compute the data likelihood, for normal data the likelihood takes a larger value than anomalous data, which has smaller value of likelihood. A simple unsupervised/semi-supervised classification algorithm can be built on the top of likelihood computation to classify the test data into normal and anomalous data.

There are some patent documents relating to time series analysis. PL1 discloses a clustering algorithm of time series data using Dirichlet process mixture model, in which true features contributing the clustering and noise features not contributing the clustering are distinguished. PL2 discloses a technique to solve a model selection problem for latent feature models based on factorized asymptotic Bayesian inference.

CITATION LIST

Patent Literature

[PL1] Japanese Patent Application Publication No. 2013-097615
[PL2] Japanese Translation of PCT International Application No. 2016-520220

SUMMARY OF INVENTION

Technical Problem

In conventional approaches, clustering/anomaly detection scheme is provided in a data type specific manner. The objective of the present invention is to provide a general framework for time series modeling, which can accommodate different data types.

Solution to Problem

There is provided an information processing apparatus comprising a processor and memory storing instructions. The processor is configured to execute the instruction to: 1) acquire multiple data streams, each of the data streams representing the time sequence of observed data along with time stamps thereof; 2) recursively perform, till a preset termination condition is met: 2-1) assign one of clusters to each input data stream by sampling a cluster identity for each input data stream from a cluster identity distribution, wherein in the assignment of the cluster identity, the cluster identity distribution is updated through optimization of parameters of the cluster identity distribution; 2-2) for each cluster, update dynamics of the cluster by optimizing a proposal posterior for the dynamics of the cluster; 2-3) for each data stream, update individual response of the data stream by optimizing a proposal posterior for the individual response of the data stream, the individual response of the data stream representing sensitivity of the data stream towards the dynamics of the cluster to which the data stream is assigned; 2-4) for each data stream, update the latent states of the data stream based on the updated individual response of the data stream; 2-5) for each data stream, for each time stamp, update an observation model of the data stream at the time stamp by transforming the latent states of the data stream at the time stamp into parameters of the observation model using transformation function corresponding to a data type of the data stream, transformation function being different for each data type; 3) for each cluster, generate a model data based on cluster identity distribution, the dynamics of the cluster, the dynamics of each data stream assigned to the cluster, and the latent states corresponding to each data stream assigned to the cluster.

There is provided a control method performed by a computer. The control method comprises: 1) acquiring multiple data streams, each of the data streams representing the time sequence of observed data along with time stamps thereof; 2) recursively performing, till a preset termination condition is met: 2-1) assigning one of clusters to each input data stream by sampling a cluster identity for each input data stream from a cluster identity distribution, wherein in the assignment of the cluster identity, the cluster identity distribution is updated through optimization of parameters of the cluster identity distribution; 2-2) for each cluster, updating dynamics of the cluster by optimizing a proposal posterior for the dynamics of the cluster; 2-3) for each data stream, updating individual response of the data stream by optimizing a proposal posterior for the individual response of the data stream, the individual response of the data stream representing sensitivity of the data stream towards the dynamics of the cluster to which the data stream is assigned; 2-4) for each data stream, updating the latent states of the data stream based on the updated individual response of the data stream; 2-5) for each data stream, for each time stamp, updating an observation model of the data stream at the time stamp by transforming the latent states of the data stream at the time stamp into parameters of the observation model using transformation function corresponding to a data type of the data stream, transformation function being different for each data type; 3) for each cluster, generating a model data based on cluster identity distribution, the dynamics of the cluster, the dynamics of each data stream assigned to the cluster, and the latent states corresponding to each data stream assigned to the cluster.

Advantageous Effects of Invention

In accordance with the present invention, it is provided a general framework for time series modeling, which can accommodate different data types.

BRIEF DESCRIPTION OF DRAWINGS

Aforementioned objects, procedure and technique for behavior modeling will be made comprehensible via selected example embodiments, described below, and the aided drawings.

DESCRIPTION OF EMBODIMENTS

Figure 1:
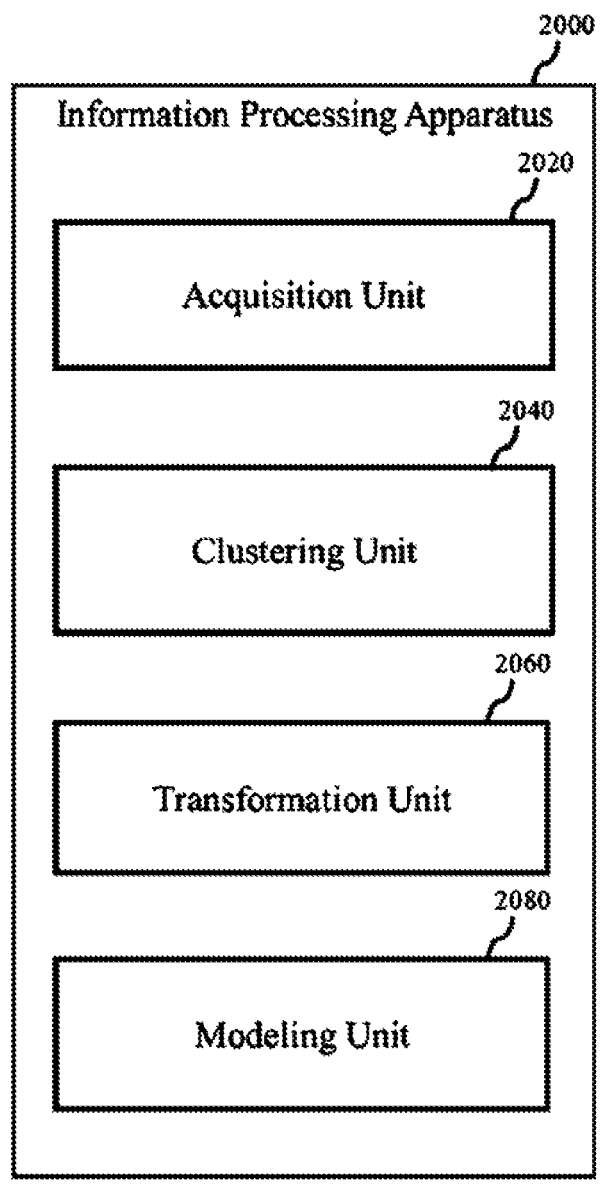
FIG. 1 illustrates an example diagram of a function-based configuration of the information processing apparatus of the example embodiment 1.

Hereinafter, example embodiments of the present invention will be described with reference to the accompanying drawings. In all the drawings, like elements are referenced by like reference numerals and the descriptions thereof will not be repeated.

Example Embodiment 1

<Overview>

The information processing apparatus of example embodiment 1 (the information processing apparatus 2000 depicted in FIG. 1) takes in multiple input data streams from the training data, and performs the cluster assignment based likelihood of each data with a shared cluster dynamics. The information processing apparatus 2000 further transforms the latent states into parameters of an observation model for representing the observed data, through a use defined transformation function. As a result, all the learnt model parameters are learnt. In other sense, the information processing apparatus 2000 of the example embodiment 1 performs the training phase for time series modeling.

The input data to the information processing apparatus 2000 comprises time series data of different data types e.g. both discrete and real data. This covers the vast range of time series data, such as categorical, count, trajectory and financial data time series. The latent variables of the information processing apparatus 2000 find similarity in the time series. Learnt model data corresponds to the learnt posterior information over latent variables/parameters, for each cluster and each individual data stream. The cluster size is unrestricted and is data driven, i.e. the number of clusters grow with dataset size. Moreover, the clusters are discovered so that, for all the data inputs, the total likelihood of the data is maximized.

FIG. 1 illustrates an example diagram of function-based configuration of the information processing apparatus 2000 of the example embodiment 1. The information processing apparatus 2000 of the example embodiment 1 includes an acquisition unit 2020, a clustering unit 2040, a transformation unit 2060, and a modeling unit 2080. The acquisition unit 2020 acquires multiple input data streams from training dataset.

From modeling perspective, clustering assignment rule is according to the Dirichlet process mixture model or DPMM, and therefore all the input data streams may be clustered into several clusters. As the data arrives, the DPMM assigns input data to one of the existing clusters or creates a new cluster with some positive probability. Thus, such assignment could result in possibly unbounded number of clusters.

Once the representation of each input data stream series is done through Markov chain of latent variables, the latent states are then transformed using a pre-defined function for transforming the latent states into parameters of the observational model. Note that, the pre-defined transformation function will take different range for different observation distribution, e.g. range over simplex for categorical observation model. For each time frame, the observed time series value is considered as random output from observation model with parameter given by the transformation unit 2060.

As Bayesian model, the cluster assignment distribution for each data input is constructed via stick breaking construction of Dirichlet processes. The stick breaking construction of the DPMM is well known in the Bayesian non-parametrics literature. For each cluster and each time frame, the clustering unit 2040 further models the global latent variables with a distribution with predefined distribution parameters or their priors. The global latent variables of the cluster are shared for all the input data streams assigned to that cluster. One of the global latent variables is cluster dynamics.

The clustering unit 2040 binds the global latent variables for each cluster to the individual parameters, such as individual responses towards the dynamics of the cluster. This parameter is denoted as individual response parameter in this example embodiment. The dynamics of individual data stream, or individual dynamics, is derived from a distribution whose parameters are the scaled versions of the cluster dynamics. The individual dynamics is then coupled with the latent process, to obtain the latent states that correspond to the individual evolution over time.

The transformation unit 2060 represents transformation between states of the latent process and the parameter range of the observational distribution. This can be achieved through a predefined function, initialized by the user. The domain of this function is determined by the latent process and the range of function depends of the parameter range of the observational distribution. This unit can be thought as transforming the latent states into valid set of parameters for the observation model.

The modeling unit 2080 generates the model data including all the optimized parameters of all the model latent variables, which are optimized inside the clustering unit (2040). The information in the model data includes all the posterior parameters that are optimized during learning over the data streams.

<Advantageous Effect>

The main contribution of the present invention lies in providing a general framework for time series modeling, which can accommodate different data types. Thus reducing the efforts involved in construction of observation specific models which vary according to data types. The latent model for time series modeling can be kept same across all the data types, and thus the inference algorithm remains same for the latent structure of the model, one just need to modify the update structure for the observation model, according to different data types. Additionally, the current invention provides a bridging gap between general observation model and Bayesian non-parametrics for time series models. This further simplifies the learning complexity, since Bayesian non-parametrics does not require fixing the number of clusters, thus reduces the time involved in model validation.

Hereinafter, more details of the information processing apparatus 2000 of example embodiment 1 will be described.

<Flow of Process>

Figure 2:
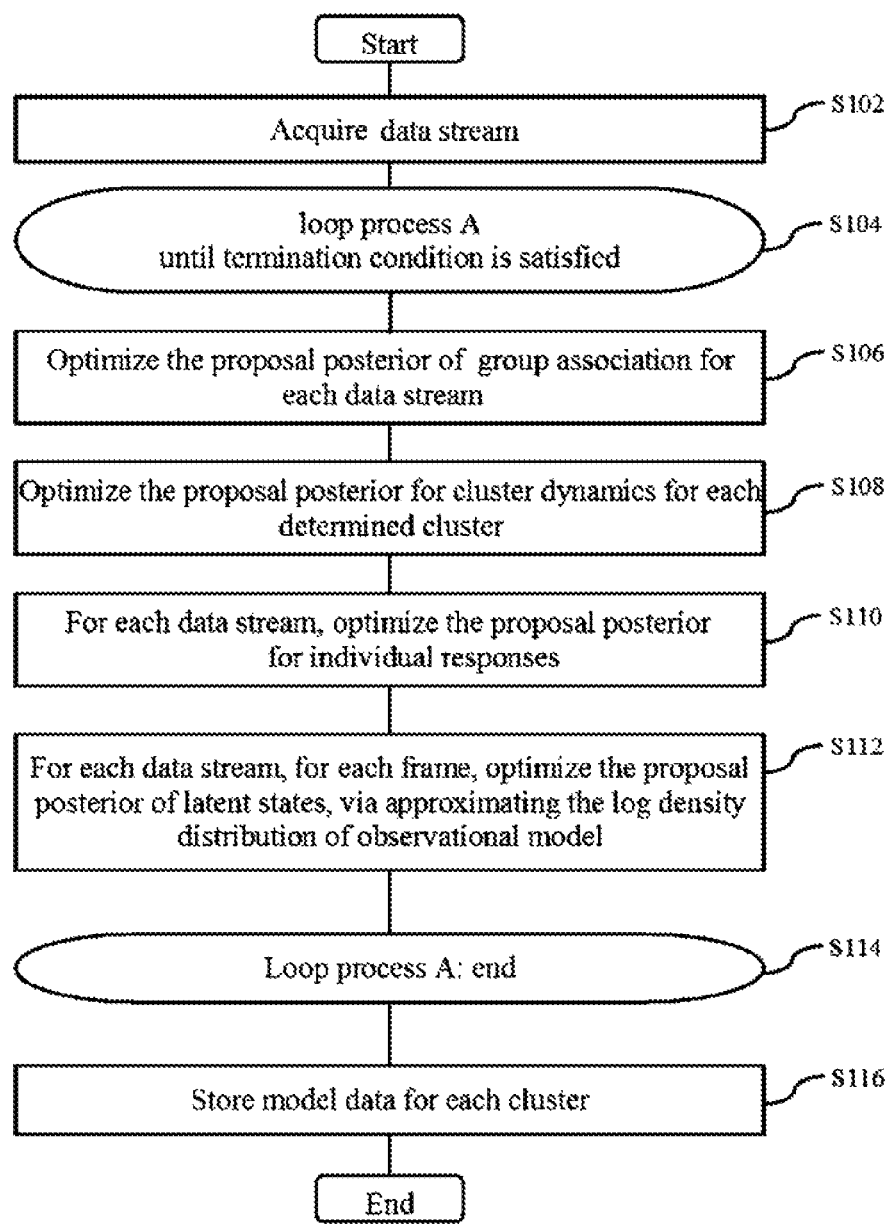
FIG. 2 is a flowchart illustrating a flow of processes performed by the information processing apparatus of the example embodiment 1.

FIG. 2 is a flowchart that illustrates the process sequence performed by the information processing apparatus 2000 of the example embodiment 1 for time series clustering. The acquisition unit 2020 acquires the input data streams (S102).

Steps S104 till S114 represent one epoch of the loop process A, which is repeatedly performed until a preset termination condition is met. The preset termination condition may be number of times the loop process A has to be performed, saturation of the data log-likelihood, or an equivalent scheme to decide the convergence of optimization algorithm that preferably does not affect the performance.

The clustering unit 2040 assigns the input data streams to determined clusters (S106), the assignment rule being governed by the cluster identity distribution for each input data stream. The cluster identity distribution is an outcome of optimization of the divergence of joint posterior and the proposed posterior. The optimal parameters for cluster identity distribution for each data stream are obtained in S106. Once these optimal parameters are driven, the clustering unit 2040 then represents the dynamics of individual data stream using global latent variables through optimized cluster dynamics (S108) and individual responses (S110) towards the cluster dynamics. The individual dynamics is then used to represent the states of latent process (S112), which serves as parameters to the observation model.

The transformation unit 2060 uses the states of latent process (S112) to generate the parameters for observation model. The parameters are obtained by transforming the states into parameter space, using a predefined transformation function that is initialized by user at the beginning. As discussed above, the transformation function has range in the parameter domain, and the observed time series value is realized as random sample from observational distribution with this transformed latent state as parameter. During training phase, the optimal latent state distribution is obtained by approximating the log-likelihood of the observation conditioned on latent state (S112), thus it involves jointly approximating the compound of transformation function and observational density. The approximation approach depends on the proposal posterior distribution, generally the approximation is such that, it can be represented in conjugate form w.r.t. other proposal posteriors of the approximating model.

Once the loop process A is terminated according to preset termination condition, the modeling unit 2080 generates the model data for each group (S116).

<Input Data>

The input data is an ensemble of data streams, equivalently a sequence of observations with time stamps. The input data can be either discrete or real data values. The discrete case for current example embodiment may include count data or categorical data, whereas the real case may include financial time series, price index, which are restricted to take positive real values, or a trajectory data of a tracked object in real world plane, which can take any real value. For categorical data, the data is represented by one-hot vector, i.e. vector of zeroes and one, one corresponding to the category being taken. For other data types, the input data may have same format as the observation. Note that, acquiring such dataset, one can use vast number of conventional approaches proposed for each data type.

<Clustering>

For each input data stream, the clustering unit 2040 assigns the data to determined clusters. The cluster assignment rule may be governed by stick breaking construction of Dirichlet process mixture model (DPMM). The cluster indicator variable is denoted by $c_i$, which can take positive integer value. Note that, stick breaking construction of DPMM is widely popular in Bayesian non-parametrics, thus we avoid discussing it.

<Cluster Dynamics>

For each cluster, the associated global parameters include the cluster dynamics, or equivalently the sequence which denotes the global change in the values. The cluster dynamics of cluster k at time t is represented by $\eta[k,t]$. The prior distribution for the cluster dynamics can be predefined, through preset list of parameters. One possible take for prior distribution for the cluster dynamics is multivariate normal distribution, other can be multivariate exponential distribution, where each component of the dimension is distributed with an exponential distribution.

The cluster dynamics for a cluster is shared for all the data streams that are assigned to that cluster, thus it gives rise to the similarity among the assigned data streams.

<Individual Response>

For each individual data stream, a local latent variable, called individual response parameter, is designated. For individual data stream i, the individual response parameter is denoted by scalar variable $\lambda[i]$. The individual response for the data stream assigned to cluster k at time t is realized through random variable δ[i,t], which has predefined distribution with mean parameter as λ[i]*η[k,t], formally as:

Equation 1

$$\delta[i,t] \cdot P \text{ were } E_P[\delta[i,t]] = \lambda[i] * \eta[k,t] \quad (1)$$

Note that the response variable acts as scaling quantity in individual response term, thus it is required for λ[i] to take positive values only. A wide range of distribution choices are available that satisfy this condition in practice. For example, λ[i] can be distributed according to Gaussian distribution with appropriate preset parameters, or as exponential distribution with predefined mean variable.

<Latent Process>

The input data stream is derived from a distribution whose parameters follow a latent process. The latent states for the data stream i at time t are denoted by z[i,t]. The latent states are formulated as an auto-regressive model with a finite degree q; that is, the latent state at time t depends on its previous q states through a linear relationship. For q=1 it translates to AR(1) model, which can be written as:

Equation 2

$$z[i,t] = a[i] * z[i,t-1] + \delta[i,t] \quad (2)$$

Where a[i] denotes the auto-regressive parameter and δ[i,t] denotes the individual dynamics.

Given that the initial distribution of latent state at time t=0 is multivariate normal distribution, and that the individual response is derived from multivariate normal distribution, the sequence of latent states turns out to be jointly distributed as multivariate normal distribution.

<Transformation Function>

The transformation function provides the parameter for observation model. The observation model can be further broken as:

Equation 3

$$x_{i,t} \cdot P_{\theta_{i,t}} \text{ has density } p(x_{i,t}; \theta_{i,t}) \quad (3)$$

Where x[i,t] represents an observation at time t indicated by the data stream i, P denotes the observation distribution.

Given data type of the data streams, the observation model can be chosen according to following thumb rule
1. The data streams in the dataset must be distributed according to the observation distribution. For example, in case of pedestrian trajectory data, the positions of individuals at same time frame can be thought to have multivariate normal distribution (or mixtures of multivariate normal distributions). Thus for such data, the observation model can be chosen to multivariate normal distribution.

The observation distribution P has parameter θ[i,t], given by transformation function f( ) as:

Equation 4

$$\theta[i,t] = f(z[i,t]) \quad (4)$$

Note that, for θ[i,t] to be a valid parameter of the observation distribution, the range of transformation function f( ) is required to be in parameter space of the observation distribution. For example, for exponential observation distribution, the parameter θ can be thought as mean parameter of the distribution, which always takes non-negative values.

For four example categories of the data types discussed, we provide an example tabular pair of observation distribution and the distribution parameter which is modeled through latent variable. Note that, the data type of the data stream is acquired along with the data stream.

TABLE 1

| Data Type | Observation Distribution | Parameter [θ] | Parameter space [Ω(θ)] |
|---|---|---|---|
| Multidimensional trajectory data | Multivariate normal (D - Dimensional) | Mean | $\mathbb{R}^D$ |
| Financial data | Exponential | Mean | $\mathbb{R}^+$ |
| Categorical data (C - categories) | Categorical | Category probability | Simplex (C - 1) |
| Count data | Poisson | Mean | $\mathbb{R}^+$ |

Given the type of data, and observation distribution, the transformation function is required to meet certain conditions, these are
1. Domain of the transformation function must be in multi-dimensional real space.
2. Range of the transformation function must be in parameter space, for given parameter and observation distribution pair.
3. The transformation function must be a smooth, concave and monotonous function over multi-dimensional real space.
4. First order and second order derivatives of the transformation function must exist, additionally the first order derivative must be continuous.

Once these all conditions are met, and a preset transformation function is available, the posterior maximization algorithms such as non-conjugate variational inference algorithm can be applied. At each iteration, the non-conjugate variational inference algorithm locally approximates the observational distribution density with a multivariate normal density given the latent state. Theoretically this approximation is valid only if aforementioned conditions over transformation function are met. We omit discussing non-conjugate variational inference algorithm and other related posterior approximating techniques, since these approaches are well established.

The variational inference algorithm for posterior maximization gathers the information from the observation distribution through approximating the observational distribution density. The approximation of the observational density captures the local gradient and curvatures with respect to latent state, i.e. the local trend of the observational density. This set of local information is then merged into the latent process, thus binding the modeling phase and a general observational distribution with transformation function through local approximation.

In simplest form, for multivariate normal as observation distribution and identity function as transforming unit, the local curvature results in the covariance matrix, where as the local gradient capture the trend of variation. This exactly approximates the observation model in case of multivariate normal distribution results in usual posterior updates. Thus present invention generalizes the conventional approaches to some extent.

Below we provide a table 2 that shows an example list of appropriate transforming function, satisfying the abovementioned conditions.

TABLE 2

| Data Type | Observation Distribution | Parameter [θ] | Transformation function |
|---|---|---|---|
| Multi-dimensional trajectory data | Multivariate normal (D - Dimensional) | Mean | f(z) = z |

TABLE 2-continued

| Data Type | Observation Distribution | Parameter [θ] | Transformation function |
|---|---|---|---|
| Financial data | Exponential | Mean | f(z) = log (1 + exp(z)) |
| Categorical data (C - categories) | Categorical | Category probability | f(z) = c₀exp(z) |
| Count data | Poisson | Mean | f(z) = log (1 + exp(z)) |

Transformation function for categorical data has positive normalizing constant c0 to ensure all the category probabilities sum to unity.

<Observation Model>

In the present invention, we propose a general observation model consisting pair of observation distribution and the transformation function as described earlier. The observation model varies according to the observation data type, and also the corresponding transformation function. The inference algorithm for this general observation model is chosen to be variational inference algorithm. However, since the observation distribution lies in a different family of distributions than marginal distribution of model latent variables, this difference amounts to non-conjugacy in the model and thus requires non-conjugate variational inference approach, as we discuss below.

<Inference Algorithm>

In this section we provide an example algorithm to perform model inference in the present modeling task. Since general observation model has non-conjugate observation distribution, than rest of the model latent variables, one can use special class of optimization based algorithms for model inference, called non-conjugate variational inference.

Figure 3:
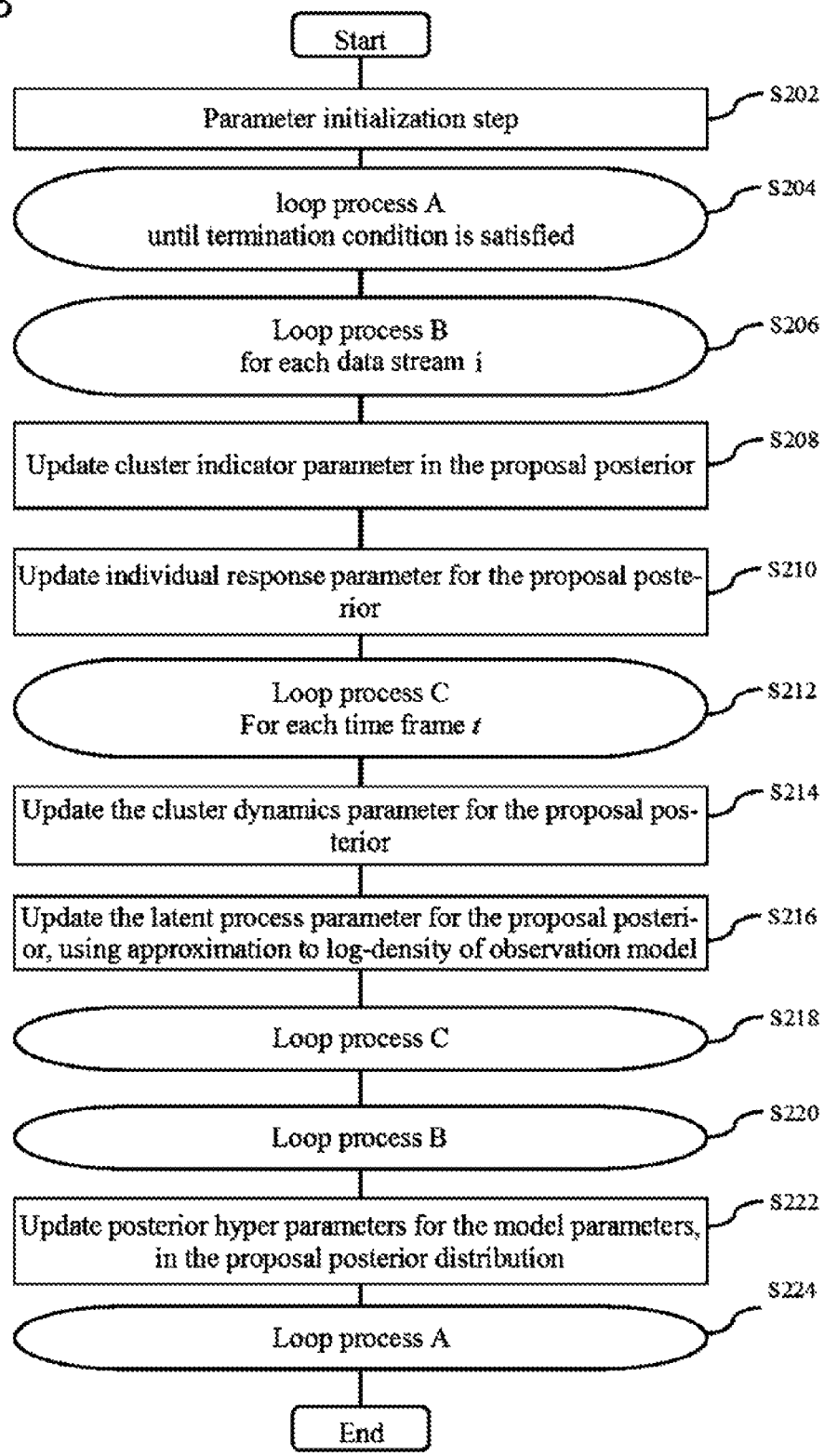
FIG. 3 is a flowchart illustrating a flow of processes performed by the information processing apparatus of the example embodiment 1.

FIG. 3 illustrates an example algorithm, respectively the non-conjugate variational inference algorithm for time series clustering. Inference algorithm aims to explore the approximating structure of the current model, through proposal posterior distribution. Again, the terms variational inference and proposal posterior (approximating posterior) are well known in Bayesian modeling, thus we omit the theoretical introduction of both. Note that, the details of FIG. 3 will be explained later.

<Proposal Posterior>

Since exact computation of the posterior in current model in intractable, we adhere to an approximating posterior, which is relatively easy to evaluate. This approximating posterior is often termed as proposal posterior We propose structured mean field approximation, which has the following proposal posterior:

Equation 5

$$q(\pi',c,\lambda,\eta,z) = q(\pi')q(c)q(\lambda)q(\eta)q(z) \quad (5)$$

The left-side term of the above equation denotes the proposed posterior distribution for approximating the model posterior in variational inference algorithm. Each posterior term in the right side represent the distribution over latent variables, with some posterior parameters Each term of the right side of the proposal posterior can be understood as described in the following Table 3:

TABLE 3

| Terminology | Notation |
|---|---|
| Stick breaking posterior | $q(\pi')$ |
| Cluster indicator posterior | $q(c)$ |
| Individual response posterior | $q(\lambda)$ |
| Cluster dynamics posterior | $q(\eta)$ |
| Latent state posterior | $q(z)$ |

Note that each factor of the proposal posterior distribution has its own parameter, which are to be optimized via the variational inference algorithm.

<Loss Function>

The loss function of current model is considered as divergence between actual model joint posterior and the proposal posterior distribution. For variational inference algorithms, this divergence can be taken as Kullback-Leibler divergence or KL divergence. In general, KL divergence is simplified to lower bound on the total data log-likelihood. Thus, as an optimization problem, one needs to maximize the lower bound. The resultant loss function is thus termed as evidence lower bound or ELBO as shorthand.

The optimal factors in the proposal posterior are obtained by setting the gradient of ELBO with respect to each factor to zero. This gives out the parameter update equations, which are iteratively updated over the course of optimization process.

FIG. 3 is a flow chart illustrating a flow of the optimization process. The clustering unit 2040 performs the parameter initialization step in the proposal posterior (S202).

Once the parameter initialization step is finished, the clustering unit 2040 performs a loop process A (S204), for all the available data streams until a preset termination condition is met. The loop process A further comprises a loop process B (S206), which iterates over all the data streams, one at a time. For each data stream i, the clustering unit 2040 in the loop process B updates the posterior parameters of cluster indicator variable in the proposal posterior distribution (S208) through gradient descent optimization. Once the update for cluster indicator variable is done, the clustering unit 2040 steps for updating individual response parameter in the proposal posterior distribution (S210). Both the updates, cluster indicator and individual response parameter can be derived through taking gradient of evidence lower bound in the posterior optimization, with respect to the corresponding distribution of the proposal posterior.

After the updates for cluster indicator parameters and the individual response parameter, the clustering unit 2040 steps forward into loop process C (S212), which iterates over all the time frames for each individual data. The clustering unit 2040 then updates the cluster dynamics parameters of the proposal posterior (S214) and the latent process parameter (S216). Notice that, while updating the latent process parameters, the clustering unit 2040 approximates the log-density of the observation model using Taylor expansion of the log-density term.

Once updates for all the model latent variables are finished, the clustering unit 2040 steps to update the posterior hyper-parameters (S222). The hyper-parameters in the Bayesian model decide the distribution over the parameters of the latent variables.

As the loop process A terminates according to preset termination condition, the model data is stored. Model data includes all the learnt posterior parameters that consist of the updated parameters in the last iteration of the loop process A.

<Clustering>

Once the optimized model parameters for proposal posterior are obtained, the modeling unit 2080 determines the cluster index for each input data stream through its cluster assignment parameter. There are several approaches for determining the cluster indices for input data streams. For example, the modeling unit 2080 samples the cluster indices from a distribution whose parameters are given by the optimized parameters.

<Example Hardware Configuration>

Each functional unit included in the information processing apparatus 2000 may be implemented with at least one hardware component, and each hardware component may realize one or more of the functional units. In some embodiments, each functional unit may be implemented with at least one software component. In some embodiments, each functional unit may be implemented with a combination of hardware components and software components.

The information processing apparatus 2000 may be implemented with a special purpose computer manufactured for implementing the information processing apparatus 2000, or may be implemented with a commodity computer like a personal computer (PC), a server machine, or a mobile device.

Figure 4:
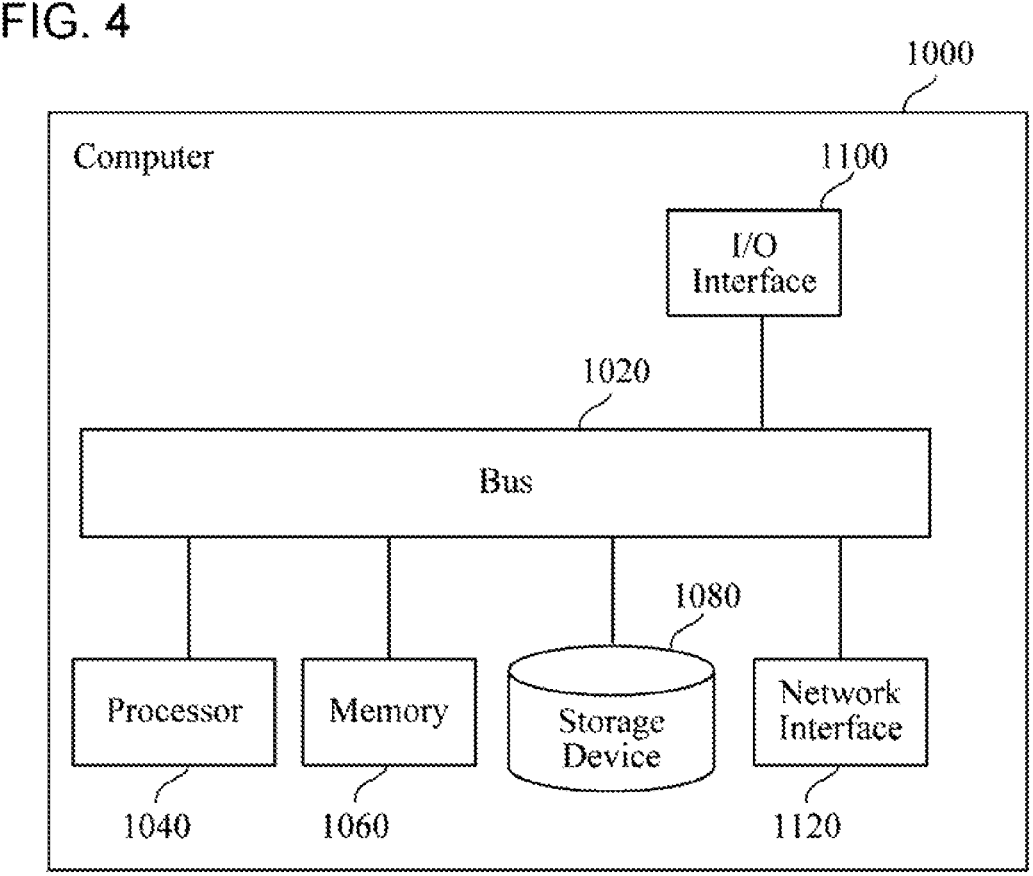
FIG. 4 is a block diagram illustrating an example of hardware configuration of a computer 1000 realizing the information processing apparatus 2000 of the example embodiment 1.

FIG. 4 is a block diagram illustrating an example of hardware configuration of a computer 1000 realizing the information processing apparatus 2000 of the example embodiment 1. In FIG. 4, the computer 1000 includes a bus 1020, a processor 1040, a memory 1060, a storage device 1080, an input-output (I/O) interface 1100, and a network interface 1120.

The bus 1020 is a data transmission channel in order for the processor 1040, the memory 1060 and the storage device 1080 to mutually transmit and receive data. The processor 1040 is a processor such as CPU (Central Processing Unit), GPU (Graphics Processing Unit), or FPGA (Field-Programmable Gate Array). The memory 1060 is a primary storage device such as RAM (Random Access Memory). The storage medium 1080 is a secondary storage device such as hard disk drive, SSD (Solid State Drive), or ROM (Read Only Memory).

The I/O interface is an interface between the computer 1000 and peripheral devices, such as keyboard, mouse, or display device. The network interface is an interface between the computer 1000 and a communication line through which the computer 1000 communicates with another computer.

The storage device 1080 may store program modules, each of which is an implementation of a functional unit of the information processing apparatus 2000 (See FIG. 1). The CPU 1040 executes each program module, and thereby realizing each functional unit of the information processing apparatus 2000.

As described above, although the example embodiments of the present invention have been set forth with reference to the accompanying drawings, these example embodiments are merely illustrative of the present invention, and a combination of the above example embodiments and various configurations other than those in the above-mentioned example embodiments can also be adopted.

What is claimed is:

1. An information processing apparatus comprising a processor and memory storing instructions, the processor is configured to execute the instructions to:
    acquire multiple data streams, each of the data streams representing the time sequence of observed data along with time stamps thereof; recursively perform, till a preset termination condition is met:
    assign one of clusters to each input data stream by sampling a cluster identity for each input data stream from a cluster identity distribution, wherein in the assignment of the cluster identity, the cluster identity distribution is updated through optimization of parameters of the cluster identity distribution;
    for each cluster, update dynamics of the cluster by optimizing a proposal posterior for the dynamics of the cluster;
    for each data stream, update individual response of the data stream by optimizing a proposal posterior for the individual response of the data stream, the individual response of the data stream representing sensitivity of the data stream towards the dynamics of the cluster to which the data stream is assigned;
    for each data stream, update the latent states of the data stream based on the updated individual response of the data stream;
    for each data stream, for each time stamp, update an observation model of the data stream at the time stamp by transforming the latent states of the data stream at the time stamp into parameters of the observation model using transformation function corresponding to a data type of the data stream, transformation function being different for each data type; and
    for each cluster, generate a model data based on cluster identity distribution, the dynamics of the cluster, the dynamics of each data stream assigned to the cluster, and the latent states corresponding to each data stream assigned to the cluster.

2. The information processing apparatus of claim 1, wherein the processor further configured to perform the optimization of parameters of the cluster identity distribution by maximizing an objective function, the objective function being lower bound on total log-likelihood of all of the data streams.

3. The information processing apparatus of claim 1,
    wherein the transformation function meets all of following constraints:
        domain of the transformation function must be in multi-dimensional real space;
        range of the transformation function must be in parameter space, for given parameter and observation distribution pair;
        the transformation function is a smooth, concave and monotonous function over multi-dimensional real space; and
        there exist first order and second order derivatives of the transformation function, and the first order derivative is continuous.

4. A control method performed by a computer, the control method comprising:
    acquiring multiple data streams, each of the data streams representing the time sequence of observed data along with time stamps thereof;
    recursively performing, till a preset termination condition is met:
    assigning one of clusters to each input data stream by sampling a cluster identity for each input data stream from a cluster identity distribution, wherein in the assignment of the cluster identity, the cluster identity distribution is updated through optimization of parameters of the cluster identity distribution;

for each cluster, updating dynamics of the cluster by optimizing a proposal posterior for the dynamics of the cluster;

for each data stream, updating individual response of the data stream by optimizing a proposal posterior for the individual response of the data stream, the individual response of the data stream representing sensitivity of the data stream towards the dynamics of the cluster to which the data stream is assigned;

for each data stream, updating the latent states of the data stream based on the updated individual response of the data stream;

for each data stream, for each time stamp, updating an observation model of the data stream at the time stamp by transforming the latent states of the data stream at the time stamp into parameters of the observation model using transformation function corresponding to a data type of the data stream, transformation function being different for each data type; and for each cluster, generating a model data based on cluster identity distribution, the dynamics of the cluster, the dynamics of each data stream assigned to the cluster, and the latent states corresponding to each data stream assigned to the cluster.

5. The control method of claim 4, wherein the optimization of parameters of the cluster identity distribution is performed by maximizing an objective function, the objective function being lower bound on total log-likelihood of all of the data streams.

6. The control method of claim 4,
wherein the transformation function meets all of following constraints:
domain of the transformation function must be in multi-dimensional real space;
range of the transformation function must be in parameter space, for given parameter and observation distribution pair;
the transformation function is a smooth, concave and monotonous function over multi-dimensional real space; and
there exist first order and second order derivatives of the transformation function, and the first order derivative is continuous.

7. The non-transitory computer readable storage medium storing a program to:
acquire multiple data streams, each of the data streams representing the time sequence of observed data along with time stamps thereof;
recursively perform, till a preset termination condition is met:
assign one of clusters to each input data stream by sampling a cluster identity for each input data stream from a cluster identity distribution, wherein in the assignment of the cluster identity, the cluster identity distribution is updated through optimization of parameters of the cluster identity distribution;

for each cluster, update dynamics of the cluster by optimizing a proposal posterior for the dynamics of the cluster; for each data stream, update individual response of the data stream by optimizing a proposal posterior for the individual response of the data stream, the individual response of the data stream representing sensitivity of the data stream towards the dynamics of the cluster to which the data stream is assigned;

for each data stream, update the latent states of the data stream based on the updated individual response of the data stream;

for each data stream, for each time stamp, update an observation model of the data stream at the time stamp by transforming the latent states of the data stream at the time stamp into parameters of the observation model using transformation function corresponding to a data type of the data stream, transformation function being different for each data type; and for each cluster, generate a model data based on cluster identity distribution, the dynamics of the cluster, the dynamics of each data stream assigned to the cluster, and the latent states corresponding to each data stream assigned to the cluster.

8. The storage medium of claim 7, wherein the computer is further caused to perform the optimization of parameters of the cluster identity distribution by maximizing an objective function, the objective function being lower bound on total log-likelihood of all of the data streams.

9. The storage medium of claim 7,
wherein the transformation function meets all of following constraints:
domain of the transformation function must be in multi-dimensional real space;
range of the transformation function must be in parameter space, for given parameter and observation distribution pair;
the transformation function is a smooth, concave and monotonous function over multi-dimensional real space; and
there exist first order and second order derivatives of the transformation function, and the first order derivative is continuous.

* * * * *